J. A. Cole,

Sawing Stone.

N° 13,866.   Patented Dec. 4, 1855.

Inventor,
Jno. Cole

UNITED STATES PATENT OFFICE.

JOHN A. COLE, OF WASHINGTON, DISTRICT OF COLUMBIA.

MACHINE FOR SAWING OUT TAPERING BLOCKS OF MARBLE.

Specification of Letters Patent No. 13,866, dated December 4, 1855.

*To all whom it may concern:*

Be it known that I, JOHN A. COLE, of the city of Washington and District of Columbia, have invented a new and useful Machine for Sawing Stone With Two Sides' Tapered at One Cut Subject to any Desired Change of Angle; and I do hereby declare that the following is a full, clear, and exact description of the construction and operation of the same, reference being had to the annexed drawings, making part of this specification, in which—

Figure 2:
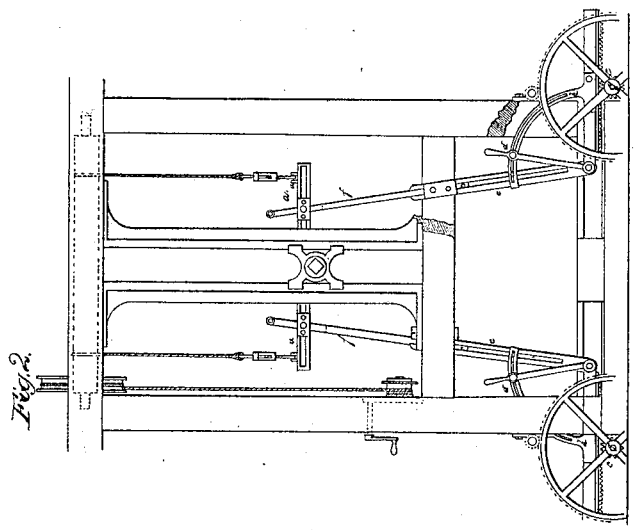
Figure 1:
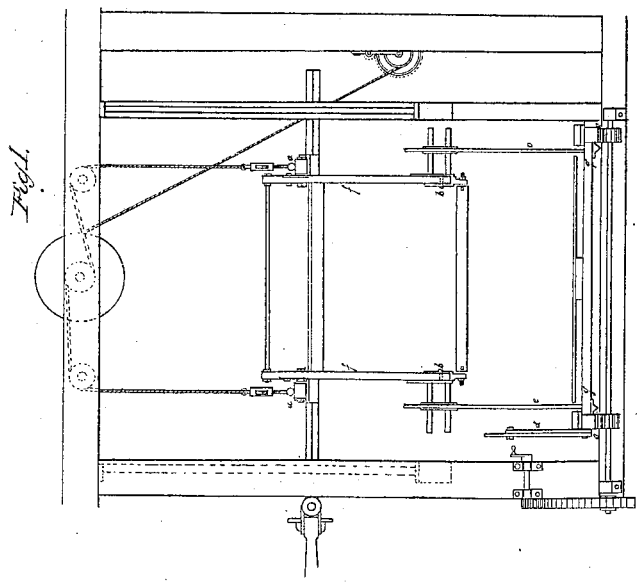

Figure 1 is a perspective view of front of machine; and Fig. 2 is an end view of same.

*a a* are two horizontal crossbeams attached to main beam which drives the saws. Saw frames *f, f,* are hung by pins *o, o,* to crossbeams *a, a,* which have slots to admit the saw frames *f, f,* to slide together or apart as desired. On the bottom of saw frames *f, f,* are shoes *b b* to which the saws are attached by draw bolts. Attached to shoes *b, b,* are two slides or sound bars, that work in a die, the die working in guides *e, e,* attached to shaft *g, g.* On each end of shaft *g, g,* is a rack *c, c,* fastened to shaft *g, g,* by straps, to admit the shaft to turn, thus giving any desired angle to guides *e e* which are kept in their position by circular plate *h,* and handle or lever *a.* This machine is calculated to saw any desired angle or straight. By putting on two crosspieces at the bottom of saw frames *f, f,* a gang of saws can be run.

Claim:

Attaching the saws to swinging frames *f, f,* by pivots at each end which will admit the shoes *b, b,* turning to any angle to follow guides *e, e,* the whole being arranged in the manner and for the purpose set forth.

JNO. A. COLE.

Witnesses:
HENRY DENMEAD,
JAS. J. JONES.